Figure 1:
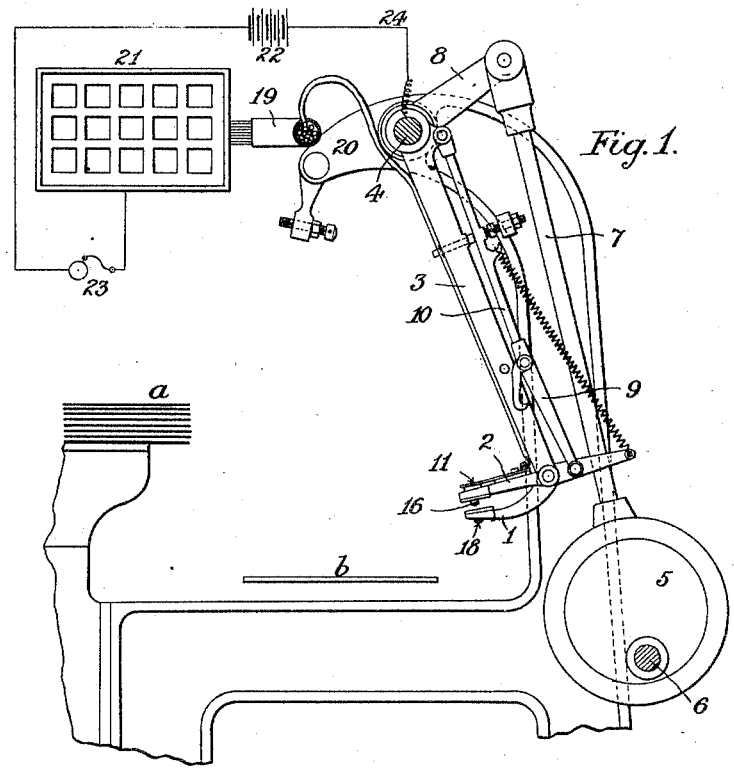

No. 775,920. PATENTED NOV. 29, 1904.
A. HESS.
MACHINE FOR COLLATING OR GATHERING LEAVES OR SECTIONS OF BOOKS.
APPLICATION FILED AUG. 15, 1904.
NO MODEL.

Witnesses:
M. J. Dixon
P. G. Thompson

Inventor:
Albert Hess,
By Henry H. Bates
Attorney.

No. 775,920. Patented November 29, 1904.

UNITED STATES PATENT OFFICE.

ALBERT HESS, OF LONDON, ENGLAND, ASSIGNOR TO T. W. & C. B. SHERIDAN COMPANY, OF NEW YORK, N. Y., A CORPORATION OF NEW YORK.

MACHINE FOR COLLATING OR GATHERING LEAVES OR SECTIONS OF BOOKS.

SPECIFICATION forming part of Letters Patent No. 775,920, dated November 29, 1904.

Application filed August 15, 1904. Serial No. 220,814. (No model.)

*To all whom it may concern:*

Be it known that I, ALBERT HESS, a subject of the King of Great Britain, residing at 35 Cloth Fair, London, England, have invented new and useful Improvements in Machines for Collating or Gathering Leaves or Sections of Books, of which the following is a specification.

This invention relates to improvements on that class of collating or gathering machine described in the specification of Patent No. 628,829, dated July 11, 1899, granted to John Bernard Mercer, and also to the improvements thereon described in the specification of the subsequent Patent No. 731,221, dated June 16, 1903, granted to the said John Bernard Mercer as the assignee of Gustav Edmund Reinhardt, in which machines a series of swinging arms provided with gripping-jaws is employed to grasp the bottom one of each of a set of piles of different leaves or sections of a book as same is separated by a suction device from the rest of the leaves or sections of a pile and then to carry the leaf or section it has seized over a traveling band or belt to which an intermittent or step-by-step motion is imparted, whereby the different sections or leaves constituting a complete publication are collated and gathered in sets on such traveling band or belt as same travels from one end of the machine to the other.

In the improvement on this class of machine described in the specification of Patent No. 731,221, above referred to, means are described whereby should any one of the set of gripping-jaws carried by the swinging arms from any cause fail to seize a leaf or section from its particular pile a visible signal was actuated, so as to indicate the fact to the operator and permit him to at once stop the machine and remedy the fault.

The present invention relates to an improvement upon this particular feature of the machine; and it consists, broadly, in means for actuating both an audible as well as a visible signal upon the failure of any one of the set of gripping-jaws to seize a leaf or section, such audible and visible signals being actuated electrically.

The electrical apparatus above referred to is applied in the following manner:

The jaws of the machine which grip the leaves or sections are fitted with metal (preferably brass) plates or pins, to which are connected wires attached to an electric battery, bell, and indicating board or annunciator, so that when any of the jaws fail to grip the leaves or sections the plates or pins come in contact, thereby completing an electric circuit to said bell and indicator, and thus indicating to the operator the particular leaves or sections which have failed to be collated or gathered.

A suitable method of carrying my invention into effect is illustrated in the accompanying drawings, in which—

Figure 2:
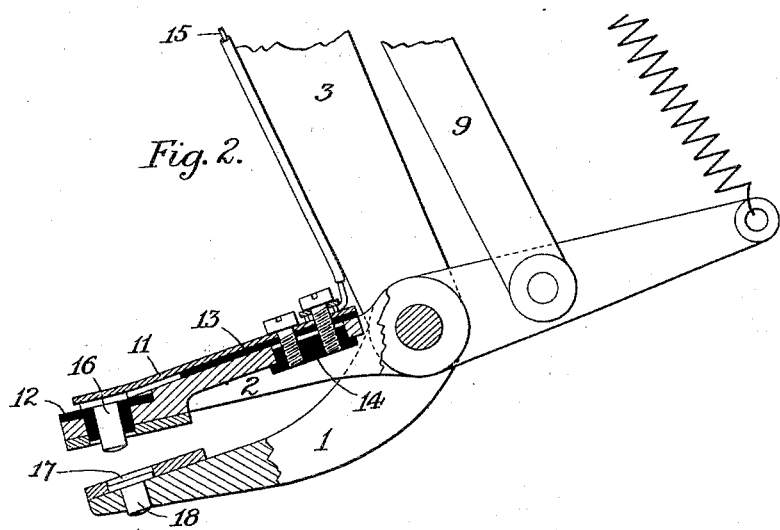

Figure 1 is a general view of the portion of the machine to which the invention relates shown in side elevation and the electrical circuit, including the battery, alarm-bell, and indicator or annunciator, diagrammatically. Fig. 2 is a vertical section, drawn on a larger scale than Fig. 1, taken through the gripping-jaws and showing the contact plates or pins for completing the circuit when such jaws fail to seize a leaf or section.

Referring to Fig. 1, $a$ represents one of the piles of leaves or sections from which the bottom one is to be removed at each operation of the gripping-jaws and carried and deposited upon the traveling belt or band $b$. The gripping-jaws 1 2, carried by the swinging arm 3, mounted on shaft 4, are operated at the desired times through the eccentric 5, mounted on driving-shaft 6, the rod 7, crank 8, and toggle-arms or jointed levers 9 10 in the manner set forth in the specification of the prior Patent No 731,221, above referred to.

It will be seen in Fig. 2 that the top jaw 2 carries a plate 11, secured thereto but insulated therefrom, as shown at 12, 13, and 14, said plate being in metallic connection with the lead 15 in a battery-circuit. This plate 11 is provided with a pin 16, projecting slightly below the gripping-surface of jaw 2. A recess 17 is formed in the lower jaw 1 and is fitted with a pin 18 in metallic connection with said arm, so that the two pins 16 and 18 will when the jaws 1 and 2 are closed be brought into contact should there be no interposed leaf or section between them.

As will be seen in Fig. 1, each of the leads or wires 15 from the series of top jaws 2 is carried upward and enters a tube 19, mounted on the bracket 20 or the frame of the machine on which the swinging arms 3, carrying the gripping-jaws, are mounted, such wires or leads being carried to any suitable point, where they are connected, respectively, to the different disks or tablets of a suitable indicator or annunciator 21, included in the circuit of a battery 22, in which an alarm-bell 23 is also included, the other pole of the battery 22 being connected by a wire or lead 24 with the shaft 4, upon which the swinging arms 3, carrying the gripping-jaws, are mounted, whereby the lower jaw 1 is placed in metallic connection with such battery.

It will thus be seen that should the jaws 1 and 2 fail to grasp a leaf or section between them the pins 16 and 18 by coming into contact will complete the circuit from battery 22 and so cause a current to flow through the annunciator 21 and alarm-bell 23, thus releasing the particular disk connected with the given pair of gripping-jaws which are at fault and also audibly call the operator's attention to the fact that such fault has occurred and thereby enable him to remedy it.

The plate 11, to which the metallic contact-pin 16, mounted in the top jaw 2, is connected, is preferably of spring form, so as to be capable of yielding, and thus prevent any injury or disfigurement of the upper surface of the leaf or section which has been seized.

What I claim as my invention, and desire to secure by Letters Patent, is—

In machines for collating or gathering leaves or sections of books, the combination with each pair of a set of pairs of gripping-jaws mounted upon a series of swinging arms of an electric circuit, the leads or wires from which are connected respectively to the top and bottom jaws of each pair, and of a suitable indicator or annunciator and alarm-bell included in such electrical circuit.

In testimony whereof I have signed my name to this specification in the presence of two subscribing witnesses.

ALBERT HESS.

Witnesses:
W. J. FERRY,
AUGUSTUS HEAD.